United States Patent [19]

Kim et al.

[11] Patent Number: 5,401,702
[45] Date of Patent: Mar. 28, 1995

[54] MICROWAVE DIELECTRIC CERAMIC COMPOSITION

[75] Inventors: Kyung Y. Kim, Seoul; Jung R. Yun, Daejeon; Suk K. Hong, Kyungki; Kwang H. Chang, Seoul, all of Rep. of Korea

[73] Assignee: Korea Institute of Science and Technology, Seoul, Rep. of Korea

[21] Appl. No.: 177,492

[22] Filed: Jan. 5, 1994

[30] Foreign Application Priority Data

Oct. 4, 1993 [KR] Rep. of Korea ............... 20437/1993

[51] Int. Cl.$^6$ .............................................. C04B 35/46
[52] U.S. Cl. ................................................ 501/136
[58] Field of Search ............................. 501/134, 136

[56] References Cited

U.S. PATENT DOCUMENTS

| | | | |
|---|---|---|---|
| 3,660,124 | 5/1972 | Yoshioka et al. | 501/136 |
| 4,489,168 | 12/1984 | Wank et al. | 501/136 |

FOREIGN PATENT DOCUMENTS

| | | | |
|---|---|---|---|
| 0195575 | 11/1984 | Japan | 501/136 |
| 0724474 | 3/1980 | U.S.S.R. | 501/136 |

OTHER PUBLICATIONS

Ba($M_{r1/3}Ta_{2/3}$)$O_3$ Ceramics with Ultra-Low Loss at Microwave Frequencies, K. Matsumoto et al., pp. 118–121, IEEE, 1986 no month.

Microwave Characteristics of (Zr, Sn)$TiO_4$ and BaO–PbO–$Nd_2O_3$–$TiO_2$ Dielectric Resonators, K. Wakino et al., Journal of the American Ceramic Society, vol. 67, No. 4, pp. 278–281, 1984 no month.

Material Produces Small Resonators with High Dielectric Constant, Junichi Kato, JEE, Sep. 1991, pp. 114–118.

Resonant Modes of a Dielectric Rod Resonator Short-Circuited at Both Ends by Parallel Conducting Plates, Yoshio Kobayashi et al., IEEE Transactions on Microwave Theory and Techniques, vol. MTT-28, No. 10, Oct. 1980, pp. 1077–1085.

*Primary Examiner*—Mark L. Bell
*Assistant Examiner*—Deborah Jones
*Attorney, Agent, or Firm*—Lowe, Price, LeBlanc & Becker

[57] ABSTRACT

A microwave dielectric ceramic composition exhibiting superior high frequency characteristics, particular temperature coefficients suitable for materials for cellular phones, which composition comprises approximately 0.1 to approximately 0.3 mole fraction of $CaTiO_3$ having a negative temperature coefficient and approximately 0.9 to approximately 0.7 mole fraction of ($Li_{\frac{1}{2}}Nd_{\frac{1}{2}}$)$TiO_3$ having a positive temperature coefficient, and optionally a predetermined amount of an additive, preferably $Nd_2O_3$, $Li_2CO_3$, $Na_2CO_3$ and $CeO_2$.

9 Claims, 3 Drawing Sheets

MICROWAVE DIELECTRIC CERAMIC COMPOSITION

BACKGROUND OF THE INVENTION

1. Field of the Invention

A microwave dielectric ceramic composition having high dielectric constants, high quality coefficient (Q) values, and small temperature coefficients.

2. Description of the Prior Art

Microwave communication systems such as mobile radio communication, satellite communication and satellite broadcasting systems are currently being rapidly developed. Dielectric ceramics have been extensively utilized in a band-pass filter resonator device or a microwave integrated circuit in these systems, because dielectric resonators contribute to miniaturization, they are light weight, relatively inexpensive, and improve thermal stability.

The most important characteristics required in microwave dielectric materials are:

1. a large dielectric constant ($\epsilon r$) for miniaturization, since the size of resonator is inversely proportional to the square root of dielectric constant;
2. a high Q value ($=1/\tan \delta$), to improve the selectivity of resonant frequency ($f_0$); and
3. a small temperature coefficient of resonant frequency, to obtain temperature stable resonant characteristics.

Known representative microwave dielectric materials are:

1. a composite perovskite type solid solution, such as $Ba(Mg_{\frac{1}{3}}Ta_{\frac{2}{3}})O_3$, having high Q values ($Q \times f = 200,000$) at dielectric constants ranging from 25 to 30. [reference: K. Matsumoto, T. Hiuga, K. Takada and H. Ichimura, "$Ba(Mg_{\frac{1}{3}}Ta_{\frac{2}{3}})O_3$ Ceramic with Ultra-low Loss at Microwave Frequencies" In Proc. of the Sixth IEEE International Symposium on Applications of Ferroelectrics, pp. 118~121, (1986)];
2. a simple solid solution, such as $(Zn, Sn)TiO_4$, having medium Q values ($Q \times f = 50,000$) and dielectric constants ranging from 30 to 40 [reference: K. Wakino, K. Minai and H. Tamura "Microwave Characteristics of $(Zn,Sn)TiO_4$ and $PbO-Nd_2O_3-TiO_2$ Dielectric Resonators" J. Am. Ceram. Soc. 67(4), 278-281 (1983)]; and
3. a mixed phase material, such as $(Ba,Pb)O-Nd_2O_3-TiO_2$, having high dielectric constants ranging from about 80 to about 90 but relatively low Q values ($Q \times f = 3,000$) [reference: K. Wakino, K. Minai and H. Tamura "Microwave Characteristics of $(Zn,Sn)TiO_4$ and $PbO-Nd_2O_3-TiO_2$ Dielectric Resonators" J. Am. Ceram. Soc. 67(4), 278-281 (1983)].

Recently, $(Pb, Ca)ZrO_2$ type ceramics with high dielectric constants, having dielectric constants of 100 to 105 and Q values of about 1,000 ($Q \times f = 3,000$), have been reported [reference: J. Kato, "Material Produces Small Resonators with High Dielectric Constant", JEE, Sep., 114-118(1991)]

Dielectric ceramics having high dielectric constant are suitable materials for microwave device using electric waves of long wave length and are in great demand for use in devices for cellular phones. However, it is very difficult to develop dielectric materials having temperature coefficients of from negative 30 to positive 30 ppm/°C. which also have high dielectric constants and high Q values. Since materials with high dielectric constants usually have low Q values and large temperature coefficients, it is very difficult to satisfy the three desirable characteristics in a single material system. In fact, a material satisfying the three desirable characteristics simultaneously has not been found.

SUMMARY OF THE INVENTION

An object of the present invention is to solve the aforementioned problems encountered in prior art dielectric materials and to provide a microwave dielectric ceramic composition having a superior in dielectric constant, Q value and temperature coefficient.

In accordance with an aspect of the present invention, the above object is accomplished by providing a microwave dielectric ceramic composition comprising approximately 0.1 to approximately 0.3 mole fraction of $CaTiO_3$ having a negative temperature coefficient and approximately 0.9 to approximately 0.7 mole fraction of $(Li_{\frac{1}{2}}Nd_{\frac{1}{2}})TiO_3$ having a positive temperature coefficient.

In accordance with another aspect of the present invention, the above object is achieved by providing a microwave dielectric ceramic composition comprising of 0.1 to 0.3 mole fraction of $CaTiO_3$ having a negative temperature coefficient and 0.9 to 0.7 mole fraction of $(Li_{\frac{1}{2}}Nd_{\frac{1}{2}})TiO_3$ having a positive temperature coefficient, and a predetermined amount of an additive selected from the group consisting of $Nd_2O_3$, $Li_2CO_3$, $Na_2CO_3$ and $CeO_2$.

BRIEF DESCRIPTION OF DRAWINGS

The above and other object, features and advantages of the present invention will be more apparent from the following detailed description taken with reference to the accompanying drawings, in which.

DETAILED DESCRIPTION OF THE INVENTION

Figure 1:
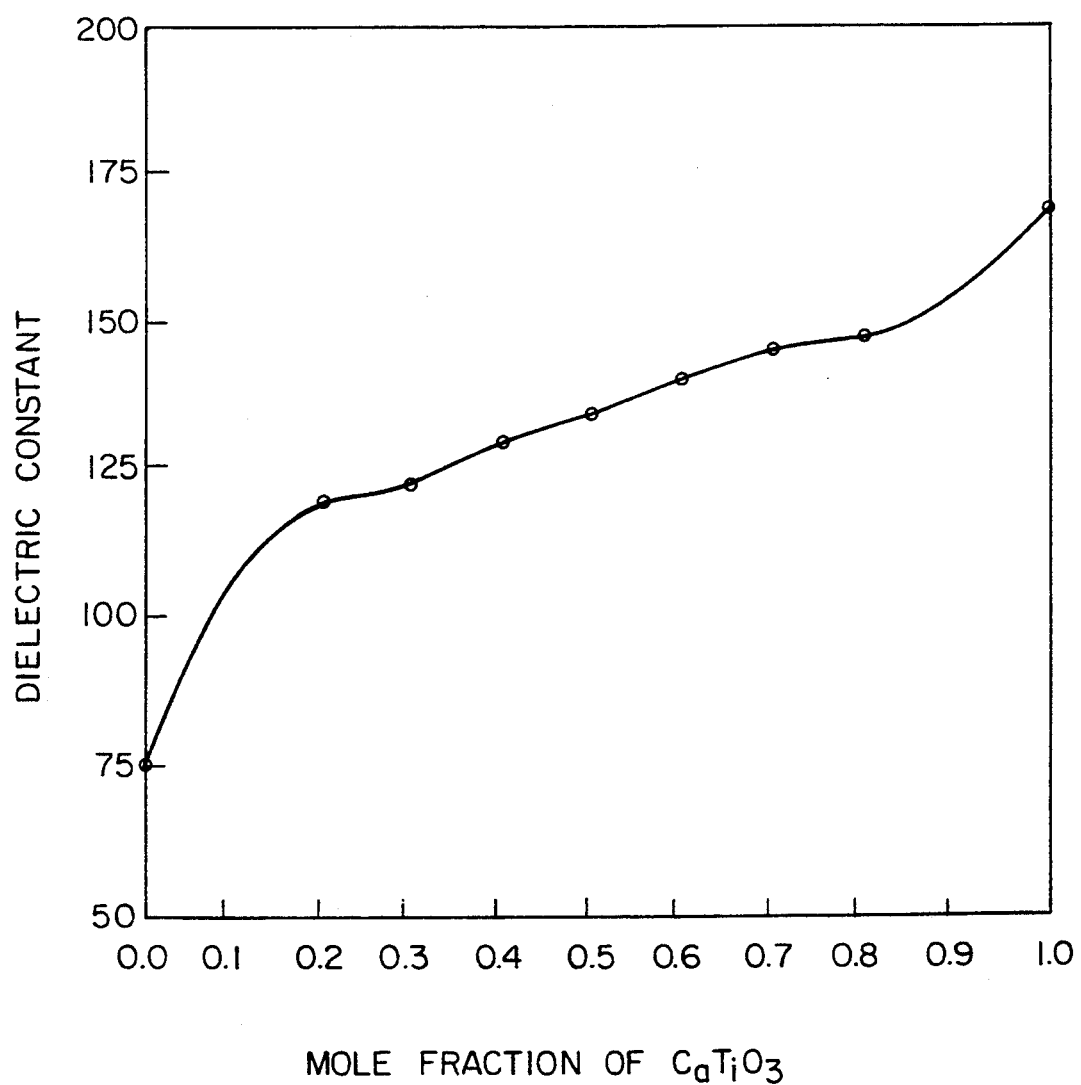
FIG. 1 is a graph showing the change in dielectric constant with the mole fraction of $CaTiO_3$ in a microwave dielectric ceramic composition consisting of $CaTiO_3$ and $(Li_{\frac{1}{2}}Nd_{\frac{1}{2}})TiO_3$.

The present invention is based on the phenomenon that when two dielectric materials having dielectric characteristics different from each other are combined, the dielectric constant and the Q value of the resulting dielectric material frequently exhibits a combination of the characteristics of the respective materials. For example, a material with a positive temperature coefficient ($T_f$) is combined with a material with a negative temperature coefficient ($T_f$), both materials having high dielectric constants and high Q values, in a predetermined mole fraction to prepare a microwave dielectric ceramic composition having superior high frequency characteristics. It is difficult to obtain good high frequency characteristics from materials combined because of differences in sintering temperature and shrinkage. Therefore, it is important to select materials having similar sintering conditions.

In the microwave dielectric ceramic compositions according to the present invention, $CaTiO_3$ (hereinafter "CT") with a positive $T_f$ is combined with $(Li_{\frac{1}{2}}Nd_{\frac{1}{2}})TiO_3$ (hereinafter "LNT") with a negative $T_f$ in a predetermined mole fraction, both having high dielectric constants and high Q values.

CT exhibits a dielectric constant ($\epsilon r$) of 170, $Q \times f = 6,000$ (f=3 GHz) and $T_f = 744$ ppm/°C. LNT exhibits a constant ($\epsilon r$) of 75, $Q \times f = 2,100$ (f=3 GHZ) and $T_f = -274$ ppm/°C. The microwave dielectric magnetic composition according to the present invention has an ideal combined structure, in which there is no solid solubility between CT and LNT.

The mole fractions of CT in the microwave dielectric magnetic composition according to the present invention is preferably on the order of 0.1 to 0.3, and the mole fraction of LNT is on the order of 0.9 to 0.7.

The microwave dielectric ceramic composition according to the present invention may be processed in a conventional manner to produce a sintered body for use in a microwave device.

The dielectric ceramic composition, comprising CT with a $T_f$ of 744 ppm/°C. and LNT with $T_f$ of $-274$ ppm/°C., exhibits a superior dielectric constant and high frequency characteristics, and favorable temperature coefficient characteristics, and is particularly useful as a dielectric ceramic material for cellular phones. In addition, the microwave dielectric ceramic composition of the present invention comprising CT and LNT may further comprise a predetermined amount of an additive. Preferred additives include $Nd_2O_3$, $Na_2CO_3$ and $CeO_2$.

The preferred embodiments of the present invention will now be further described with reference to specific examples.

EXAMPLE 1

$Li_2CO_3$, $Nd_2O_3$, $TiO_2$ and $CaTiO_3$, all of which have a purity of not less than 99%, were measured to prepare mixtures having the mole fractions given in the following Table 1, added, along with alcohol, to a polyethylene vessel using a zirconia ball mill, and subjected to the treatment of wet mixing and pulverization for 24 hours. The resulting mixed powders were dried at 60° C. for 2 hours in a suction dryer to reduce the demixing effect. The dried powders were calcined at temperatures ranging from 900° to 1,100° C. for 2 to 6 hours. A PVA binding agent was added and the mixture subjected to wet mixing and drying. Thereafter, the resulting dried powders were sieved with a sieve of 325 mesh and charged into dies having a diameter of 15 mm. The powders in the dies were molded under a pressure of 600 kg/cm² into circular plates which were subsequently sintered in a platinum box. Sintering was conducted at temperatures of 1,300°, 1,350° or 1,400° C. for 2.4 hours in the air.

After inserting the resulting sintered samples between two parallel conductive plates of a resonator, the dielectric constants were measured in the resonator in the Hakki and Coleman method and Cavity method employing $TE_{011}$ resonance mode, using a network analyzer (model name: (HP8510B).

Two samples were prepared having the same diameters and different heights, one being three times higher than the other. From the two samples, loadless Q value of the dielectric resonator was measured. The Q values of the samples were obtained with the Kobayashi and Tanaka method in which the surface resistance ($R_s$) of conductive material was gained from the loadless Q value, so as to calculate dielectric loss [reference: Y. Koyabashi and S. Tanaka, "Resonant Modes of a Dielectric Rod Resonator Short-Circuited at Both Ends by Parallel Conducting Plates", IEEE Transactions on Microwave Theory and Techniques, Vol. MTT-28, pp. 1077-1085, (1980)].

The temperature coefficients of resonant frequency were calculated by measuring resonant frequency at 25° and 65° C.

The measurement results for dielectric constant, Q value and temperature coefficient in the samples are given as shown in Table 1.

EXAMPLE 2

The composition prepared in Example 1, comprising CT and LNT in the relation of 0.20:0.80 mole fraction, was added with 0.1 to 1.5% by weight of $Nd_2O_3$ to prepare microwave dielectrics.

The measurement results for dielectric constant, Q value and temperature coefficient in the samples are given as shown in Table 2.

EXAMPLE 3

Microwave dielectrics were prepared in a manner similar to that in Example 2, except that 0.1 to 1.0% by weight of $Li_2CO_3$ was used instead of 0.1 to 1.5% by weight of $Nd_2O_3$.

The measurement results for dielectric constant, Q value and temperature coefficient in the samples are given as shown in Table 2.

EXAMPLE 4

Microwave dielectrics were prepared in a manner similar to that in Example 2, except that 0.1 to 1.0% by weight of $Na_2CO_3$ was used instead of 0.1 to 1.5% by weight of $Nd_2O_3$.

The measurement results for dielectric constant, Q value and temperature coefficient in the samples are given as shown in Table 2.

EXAMPLE 5

Microwave dielectrics were prepared in a manner similar to that in Example 2, except that 0.1 to 1.0% by weight of $CeO_2$ was used instead of 0.1 to 1.5% by weight of $Nd_2O_3$.

The measurement results for dielectric constant, Q value and temperature coefficient in the samples are given as shown in Table 2.

EXAMPLE 6

The composition prepared in Example 1, comprising CT and LNT in the relation of 0.30:0.70 mole fraction, was added with 0.1 to 1.5% by weight of $Nd_2O_3$ to prepare microwave dielectrics.

The measurement results for dielectric constant, Q value and temperature coefficient in the samples are given as shown in Table 2.

EXAMPLE 7

Microwave dielectrics were prepared in a manner similar to that in Example 2, except that 0.1 to 1.0% by weight of $CeO_2$ was used instead of 0.1 to 1.5% by weight of $Nd_2O_3$.

The measurement results for dielectric constant, Q value and temperature coefficient in the samples are given as shown in Table 2.

TABLE 1

Dielectric characteristics depending on the composition change of CT and LNT

| Composition | Dielectric constant ($\epsilon r$) | Quality coeff. (Q) | Temperature coeff. $T_f$ (ppm/cm$^2$) |
|---|---|---|---|
| CaTiO$_3$ (CT) | 170 | 2000 | +744 |
| (Li$_{\frac{1}{2}}$Nd$_{\frac{1}{2}}$)TiO$_3$ (LNT) | 75 | 700 | −274 |
| CT(.15) + LNT(.85) | 104 | 930 | −18 |
| CT(.2) + LNT(.8) | 120 | 1017 | +10 |
| CT(.25) + LNT(.75) | 123 | 1070 | +53 |
| CT(.3) + LNT(.7) | 123 | 1092 | +70 |
| CT(.4) + LNT(.6) | 130 | 1200 | +138 |
| CT(.5) + LNT(.5) | 135 | 941 | +356 |
| CT(.6) + LNT(.4) | 141 | 1051 | +379 |
| CT(.7) + LNT(.3) | 146 | 1350 | +410 |
| CT(.8) + LNT(.2) | 148 | 1500 | +468 |

TABLE 2

Dielectric characteristics depending on additives to the composition of CT and LNT

| Additive (wt %) | CT(.20) + LNT(.80) | | | CT(.30) + LNT(.70) | | |
|---|---|---|---|---|---|---|
| | $\epsilon r$ | Q | $T_f$ | $\epsilon r$ | Q | $T_f$ |
| None | 120 | 1017 | +10 | 123 | 1092 | +70 |
| Nd$_2$O$_3$ (0.1) | 119 | 1040 | +10.3 | 126.5 | 1120 | +78 |
| Nd$_2$O$_3$ (0.3) | 120 | 1055 | +11.1 | 127.1 | 1140 | +80 |
| Nd$_2$O$_3$ (0.5) | 120 | 1065 | +13.0 | 127.5 | 1170 | +81 |
| Nd$_2$O$_3$ (1.0) | 120 | 1017 | +13.3 | 127.5 | 1230 | +81 |
| Nd$_2$O$_3$ (1.5) | 120 | 1055 | +13.0 | 127.0 | 1190 | +80 |
| Li$_2$CO$_3$ (0.1) | 119 | 1040 | +8.3 | | | |
| Li$_2$CO$_3$ (0.3) | 118 | 1045 | +7.5 | | | |
| Li$_2$CO$_3$ (0.5) | 117 | 970 | +7.0 | | | |
| Li$_2$CO$_3$ (1.0) | 116 | 870 | +7.3 | | | |
| Na$_2$CO$_3$ (0.1) | 119 | 1060 | +8.0 | | | |
| Nd$_2$CO$_3$ (0.3) | 119 | 1068 | +7.5 | | | |
| Nd$_2$CO$_3$ (0.5) | 118.5 | 1100 | +7.3 | | | |
| Nd$_2$CO$_3$ (1.0) | 118.5 | 1040 | +7.3 | | | |
| CeO$_2$ (0.1) | 120 | 1105 | −3.1 | 127.3 | 1230 | +52 |
| CeO$_2$ (0.3) | 119 | 1090 | −1.5 | 126.1 | 1200 | +60 |
| CeO$_2$ (0.5) | 118 | 1085 | +3.0 | 125.1 | 1170 | +71 |
| CeO$_2$ (1.0) | 115 | 1070 | +5.3 | 123.5 | 1130 | +81 |

With reference to the drawings set forth, the characteristics and effects are to be described.

Referring to FIG. 1, the graph shows the relationship between the dielectric constant and CT mole fraction in a microwave dielectric consisting of CT and LNT. As shown, the dielectric constant of the CT-LNT dielectric increases as the mole fraction of CT increases.

Figure 2:
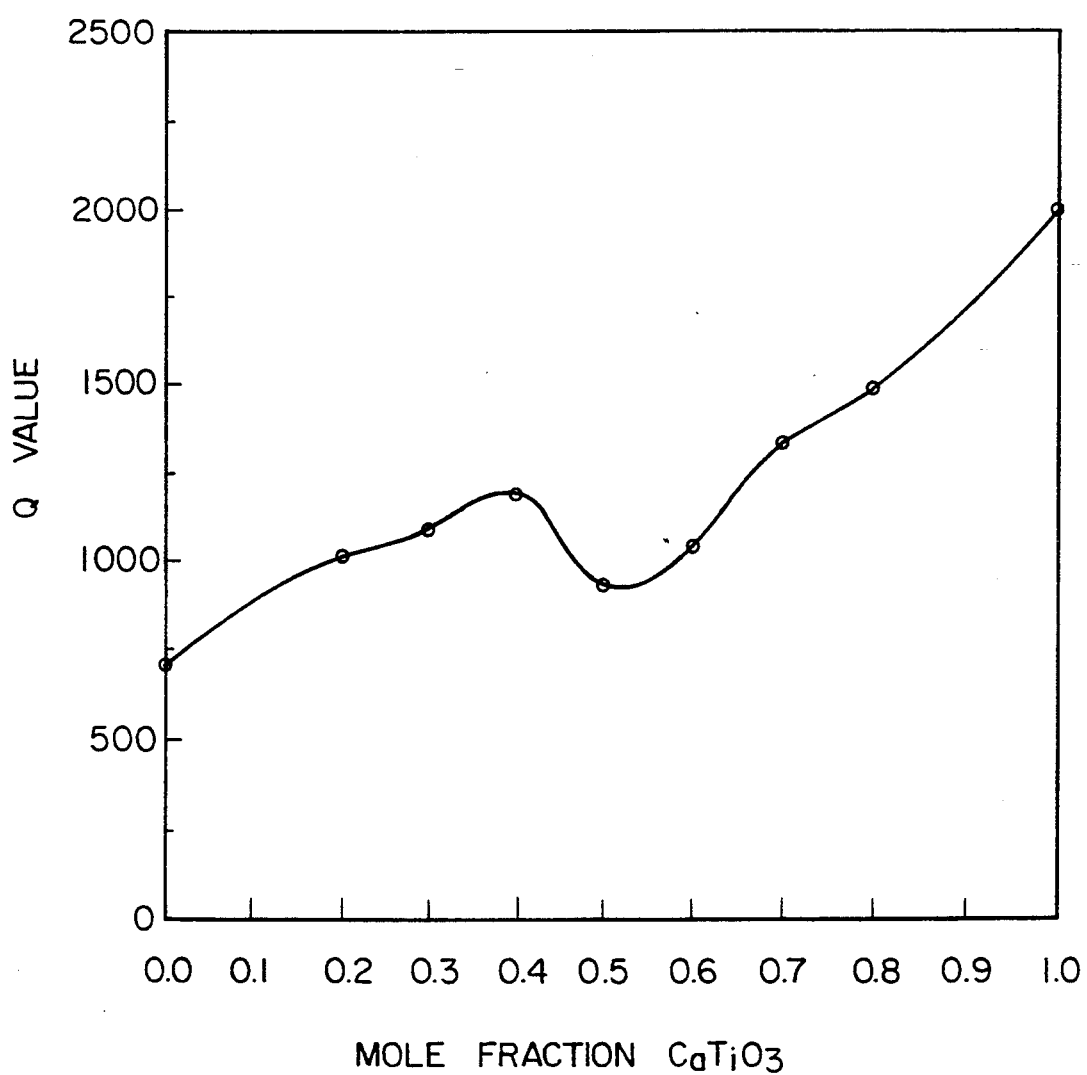
FIG. 2 is a graph showing the change in Q value with mole fraction of $CaTiO_3$ in a microwave dielectric ceramic composition consisting of $CaTiO_3$ and $(Li_{\frac{1}{2}}Nd_{\frac{1}{2}})TiO_3$.

Referring to FIG. 2, the graph shows the change of Q value with regard to the mole fraction of CT in a microwave dielectric consisting of CT and LNT. As shown, starting from 700 at which the dielectric consists of only LNT, the Q value increases as the mole fraction of CT increases and decreases when the mole fraction of CT is 0.5. The decrease is caused by the formation of a secondary phase.

Figure 3:
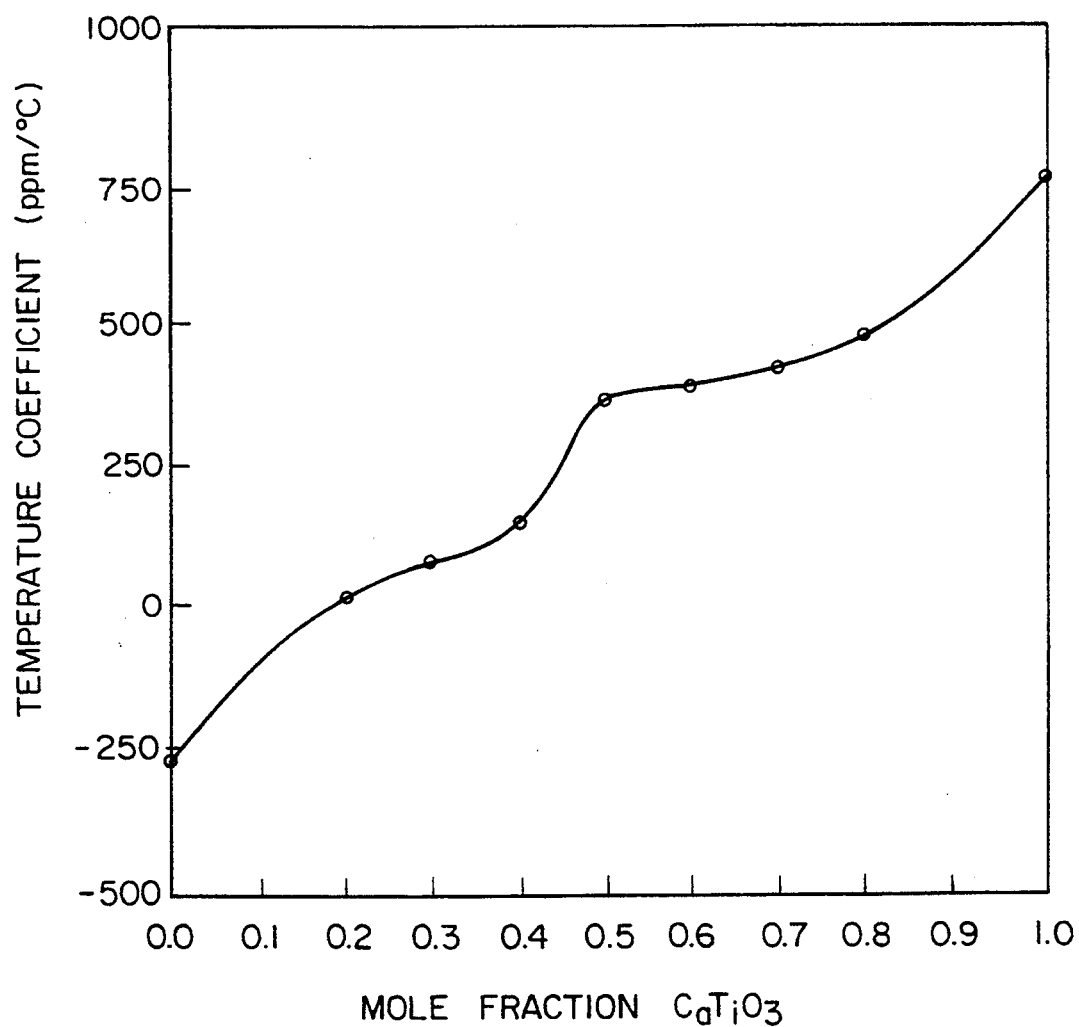
FIG. 3 is a graph showing the change in temperature coefficient with the mole fraction of $CaTiO_3$ in a microwave dielectric ceramic composition consisting of $CaTiO_3$ and $(Li_{\frac{1}{2}}Nd_{\frac{1}{2}})TiO_3$.

Turning now to FIG. 3, the curve shows the relationship between the temperature coefficient and the mole fraction of CT in a microwave dielectric consisting of CT and LNT. As shown, the temperature coefficient moves to the positive side as the mole fraction of CT increase. The negative temperature coefficient of CT and the positive temperature coefficient of LNT are supplemented reciprocally, and when the microwave dielectric comprises CT and LNT, the mole fraction of CT to LNT being 0.2:0.8, there is shown a good temperature coefficient useful for microwave dielectric ceramics for cellular phones.

As described hereinbefore, inventive microwave dielectric ceramics comprising CT (0.2 mole fraction) and LNT (0.8 mole fraction) which is sintered at 1,400° C. for 2 hours, exhibits superior high frequency characteristics, such as $\epsilon r=120$, $Q \times f=3,051$ (f=3 GHz) and $T_f= +10$ ppm/°C.

From the Example, the microwave dielectric ceramic composition containing an additive selected from the group consisting of Nd2CO3, Li$_2$CO$_3$, Na$_2$CO$_3$ and CeO$_2$ also exhibits superior high frequency characteristics.

Whilst the present invention has been described with reference to certain preferred embodiments and examples, it will be appreciated by those skilled in the art that numerous variations and modifications are possible without departing from the spirit or scope of the invention as broadly described.

What is claimed is:

1. A microwave dielectric ceramic composition, comprising approximately 0.1 to approximately 0.3 mole fraction of CaTiO$_3$ having a negative temperature coefficient and approximately 0.9 to approximately 0.7 mole fraction of (Li$_{\frac{1}{2}}$Nd$_{\frac{1}{2}}$)TiO$_3$ having a positive temperature coefficient.

2. A microwave dielectric ceramic composition according to claim 1, wherein CaTiO$_3$ and (Li$_{\frac{1}{2}}$Nd$_{\frac{1}{2}}$)TiO$_3$ have mole fraction of 0.2 and 0.8, respectively.

3. A microwave dielectric ceramic composition according to claim 1, wherein CaTiO$_3$ and (Li$_{\frac{1}{2}}$Nd$_{\frac{1}{2}}$)TiO$_3$ have mole fractions of 0.3 and 0.7, respectively.

4. A microwave dielectric ceramic composition according to claim 2, further comprising approximately 0.1 to approximately 1.5% by weight of Nd$_2$O$_3$ based on the total weight of CaTiO$_3$ and (Li$_{\frac{1}{2}}$Nd$_{\frac{1}{2}}$)TiO$_3$.

5. A microwave dielectric ceramic composition according to claim 2, further comprising approximately 0.1 to approximately 1.0% by weight of Li$_2$CO$_3$ based on the total weight of CaTiO$_3$ and (Li$_{\frac{1}{2}}$Nd$_{\frac{1}{2}}$)TiO$_3$.

6. A microwave dielectric ceramic composition according to claim 2, further comprising approximately 0.1 to approximately 1.0% by weight of Na$_2$CO$_3$ based on the total weight of CaTiO$_3$ and (Li$_{\frac{1}{2}}$Nd$_{\frac{1}{2}}$)TiO$_3$.

7. A microwave dielectric ceramic composition according to claim 2, further comprising approximately 0.1 to approximately 1.0% by weight of CeO$_2$ based on the total weight of CaTiO$_3$ and (Li$_{\frac{1}{2}}$Nd$_{\frac{1}{2}}$)TiO$_3$.

8. A microwave dielectric ceramic composition according to claim 3, further comprising approximately 0.1 to approximately 1.0% by weight of Nd$_2$O$_3$ based on the total weight of CaTiO$_3$ and (Li$_{\frac{1}{2}}$Nd$_{\frac{1}{2}}$)TiO$_3$.

9. A microwave dielectric ceramic composition according to claim 3, further comprising approximately 0.1 to approximately 1.0% by weight of CeO$_2$ based on the total weight of CaTiO$_3$ and (Li$_{\frac{1}{2}}$Nd$_{\frac{1}{2}}$)TiO$_3$.

* * * * *